May 23, 1967     G. D. RHINDRESS, JR     3,320,801
COMPRESSION AND LEAKAGE TESTER
Filed Nov. 13, 1964
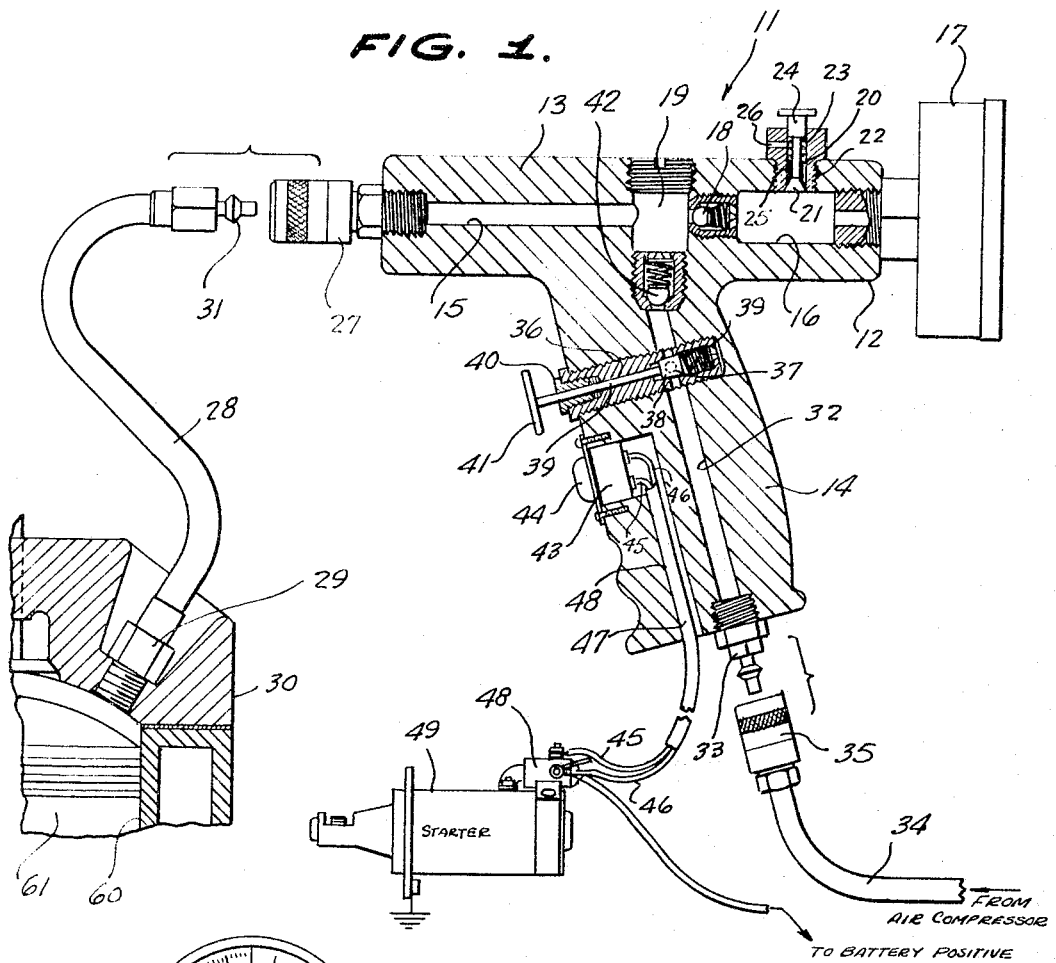
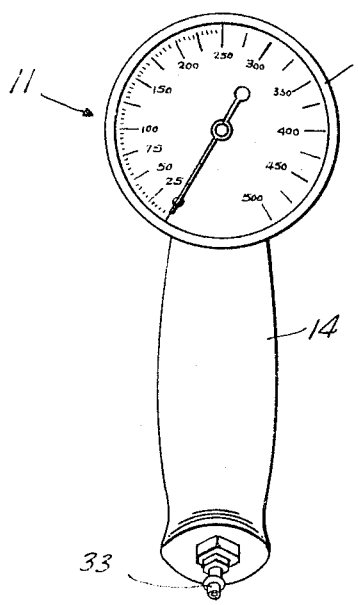
INVENTOR.
GEORGE D. RHINDRESS, JR.
BY
Berman, Davidson & Berman
ATTORNEYS

United States Patent Office 3,320,801
Patented May 23, 1967

3,320,801
COMPRESSION AND LEAKAGE TESTER
George D. Rhindress, Jr., 330 SW. 65th Ave.,
West Hollywood, Fla. 33023
Filed Nov. 13, 1964, Ser. No. 410,930
5 Claims. (Cl. 73—116)

ABSTRACT OF THE DISCLOSURE

A combination of compression and leakage tester for an internal combustion engine comprising a chamber having a pressure gauge and a passage leading to the chamber through a check valve, with a flexible hose connected to the said passage and provided with a fitting adapted to be installed in place of a spark plug in an engine block, and a pressure fluid supply connected to said passage through another check valve and including a manually-operated control valve, the device being also provided with a starter switch and flexible conductors connected to the terminals thereof and adapted to be connected to the starter switch terminals of the starting solenoid of an internal combustion engine, the device being incorporated into a body having a depending handle portion with access to the manually-operated control valve and the starter switch.

---

This invention relates to compression testers for internal combustion engines, and more particularly to a combined compression tester and device for detecting and locating leaky head gaskets, burned or sticky valves, bad piston rings, scored cylinders, and the like.

A main object of the invention is to provide a novel and improved testing apparatus for internal combustion engines for determining engine compression and for locating or detecting faulty engine components, the apparatus being simple in construction, being easy to use, and providing an efficient and reliable means for detecting and localizing engine defects, whereby such defects may be quickly and economically repaired.

A further object of the invention is to provide an improved internal combustion engine compression tester and apparatus for detecting and locating leaking head gaskets, defective valves, defective piston rings, scored cylinders, and similar deficiencies of the engine, the apparatus involving relatively simply parts, being inexpensive to manufacture, being compact in size, and being easy to attach to an engine to be tested.

Further objects and advantages of the invention will become apparent from the following description and claims, and from the accompanying drawings, wherein:

FIGURE 1 is a longitudinal vertical cross sectional view taken through an improved engine tester constructed in accordance with the present invention, shown in the process of being connected to an engine to be tested.

FIGURE 2 is a rear end elevational view of the engine tester shown in FIGURE 1.

Referring to the drawings, 11 generally designates an improved combination engine compression tester and engine defect-locating device according to the present invention. The device 11 comprises a main body 12 having a relatively elongated barrel portion 13 and a depending handle portion 14 which is integrally connected with the barrel portion 13 substantially at the midpoint of said barrel portion, as is clearly shown in FIGURE 1. The barrel portion 13 is formed with a longitudinal passage 15 which extends from one end of the barrel portion to the other. The rear end of the passage 15 is enlarged, as shown at 16, to define a fluid pressure chamber. Mounted on the rear end of the barrel portion in communication with said pressure chamber is a pressure gauge 17. A ball check valve assembly 18 is mounted in the forward end portion of the chamber 16, the ball check valve assembly 18 opening only to allow entry of fluid into the pressure chamber 16 from the space 19 forwardly adjacent thereto, said space 19 being in communication with the longitudinal bore 15, as is clearly shown in FIGURE 1.

The pressure space 16 is provided with a manually-operated vent valve 20 mounted in the top wall of said chamber 16, the vent valve being of the plunger type and having a conical valve element 21 which is biased against a correspondingly shaped seat 22 by the biasing action of a coil spring 23 bearing between the operating head 24 of the valve and an abutment sleeve 25 provided inside the main body of the assembly 20. Said main body is provided with a vent aperture 26 communicating with the atmosphere. When the head 24 is depressed, element 21 is moved downwardly away from its seat 22, allowing the chamber 16 to exhaust to atmosphere.

Connected to the forward end of the barrel 13 in communication with the bore 15 is a conventional female snap conduit fitting 27. Designated at 28 is a flexible conduit provided at one end thereof with a conduit fitting 29 having screw threads matching the screw threads of the spark plugs 30 of an internal combustion engine, whereby the conduit 28 may be connected to the engine in place of one of the spark plugs thereof merely by removing the spark plug and installing the fitting 29 in place thereof. The conduit 28 is provided at its opposite end with a conventional male snap fitting 31 adapted to be lockingly engaged in the female snap fitting 27 so as to connect conduit 28 to bore 15.

The handle portion 14 is formed with a fluid supply passage 32 communicating at its bottom end with a conventional male snap fitting 33 which is provided at the bottom of handle portion 14. Designated at 34 is a flexible conduit leading to a suitable compressed air supply, such as an air compressor, the conduit 34 being provided with a female snap fitting 35 which is adapted to lockingly receive and connect with the male snap fitting 33, whereby to connect the conduit 34 to the passage 32.

A control valve assembly 36 is provided on the handle portion 14 to control admission of fluid from passage 32 to the space 19. The control valve 36 is provided with a conical valve element 37 biased against a valve seat 38 by a coiled spring 39, the valve element 37 being mounted on the end of a push rod 39 which projects forwardly and is slidably supported in a bushing 40 provided in the forward end of the main body of the valve assembly 36. The push rod 39 is provided at its externally projected forward end with an operating head 41 which is located at the upper portion of the handle member 14 so as to be easily actuated by one of the fingers of the user's hand when the user grasps said handle portion 14.

A ball check valve assembly 42 is provided in the lower portion of the space 19, opening only to allow fluid under pressure to pass upwardly from passage 32 into the space 19, and thence to the bore 15. As previously mentioned, the admission of such fluid under pressure is controlled by the valve assembly 36, whereby the fluid under pressure will be admitted to passage 15 only when the plunger rod 39 is moved inwardly by exerting finger pressure on the operating head 41.

Mounted in the handle portion 14 below the valve assembly 36 is an engine starter switch 43 having the forwardly projecting actuating button 44, the starting switch having connected to its terminals the respective insulated wires 45 and 46 which are housed in a sheath 47 which extends through a passage 48 in the handle member 14 and emerges from the bottom end of said handle member. The insulated wires 45 and 46 are provided at their ends with suitable terminals adapted to be connected to the terminals of the starting solenoid 48 of an engine to be tested so that the starting motor 49 will be energized responsive to the closure of the switch 43. As shown in FIGURE 1, said switch 43 is located subjacent the operating head 41 of the control valve 36 so that the switch 43 may be easily actuated by a finger of the hand of the user when he grasps the handle portion 14. Thus, the operator is enabled to turn over the engine shaft while using the testing device so as to simulate engine operation and to thereby develop engine compression, which can be observed in a manner presently to be described so that it can be determined if proper engine compression is present.

In using the device, all the spark plugs are first removed from the engine 30 to be tested, the air cleaner is removed from the carburetor thereof and the oil filler cap is also removed. The wires 45 and 46 are connected to the engine starter solenoid 48 in the manner above described and the compressed air supply fitting 35 is engaged with the male snap fitting 33, whereby to connect the passage 32 to the source of compressed air. The fitting 29 is then installed in a spark plug opening by screwing said fitting 29 into said opening and the male snap fitting 31 is then connected to the female snap fitting 27, whereby to connect conduit 28 to passage 15. The engine is then turned over by actuating starter switch 43, namely, by pressing the button 44 inwardly. If the valves and piston rings of the associated cylinder are in good condition, this will initially provide a relatively low reading on the pressure gauge 17, which will increase to a maximum reading after four or more revolutions of the engine shaft, as the pressure in space 16 goes up because of the air forced past ball check valve assembly 18. Hose 28 and passage 15 are preferably relatively short in length to facilitate this build-up of pressure and are of relatively small total internal volume. The size of the bore of passage 15 in FIGURE 1 is exaggerated for clarity. By comparison of this maximum reading with a standard value for an engine in good condition, which can be obtained from the engine manufacturer, it can be easily determined as to whether the engine is developing sufficient compression. Said standard value depends upon the type of engine and other design factors, for example, if the engine is of the low compression type or of the high compression type. If the engine is of the low compression type, the standard value of compression will be somewhat less than 150 pounds per square inch, whereas if the engine is of the high compression type the standard value will be somewhat over 150 pounds per square inch.

If the reading obtained does not come within between five to ten pounds for a low compression engine or within approximately fifteen pounds for a high compression engine of the standard compression value of the engine, this indicates an engine condition which causes abnormally low compression. It is then necessary to test for bad piston rings, a leaky head gasket, burned or sticky valves, or a scored cylinder. This may be accomplished for each cylinder 60 of the engine by first bringing the associated piston 61 to a top dead center position on the compression stroke thereof, using the starter switch 43 to energize the starter motor 49 until this condition is reached. The operating head 41 of the valve assembly 36 is then actuated to admit compressed air through the passage 15 and the conduit 28 into the cylinder 60 under test. If air is heard escaping through the carburetor, this indicates a burnt or sticky intake valve. If air is heard escaping through the oil filler hole, this indicates bad piston rings or a scored cylinder wall. If air is heard escaping through the exhaust system, this indicates a bad exhaust valve. If the air is heard escaping through another spark plug opening, this indicates a bad head gasket.

In testing for compression, it will be understood that after the test has been completed on one cylinder, the same test is performed on the next cylinder, until all cylinders have been tested for compression.

After each compression test, the chamber 16 may be vented to release the pressure gauge 17 by depressing the operating plunger 24 of the vent valve 20, allowing chamber 16 to be exhausted through the vent passage 26, as above described.

While a specific embodiment of an improved testing apparatus for testing compression and location other engine defects in an internal combustion engine has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A compression tester for an internal combustion engine having a cylinder with a spark plug opening and having a starting solenoid, said tester comprising a main body having a barrel portion and a depending handle portion, said barrel portion being formed with a longitudinal passage extending from end to end thereof, the rear end of said passage being enlarged to define a fluid pressure chamber, a pressure gauge mounted on the rear end of said barrel portion in communication with said pressure chamber, normally closed vent valve means in a wall of the pressure chamber, means to at times open said vent valve means, a check valve in the forward end of said pressure chamber opening only to allow entry of fluid into the pressure chamber, a flexible conduit having a fitting on one end engageable in the spark plug opening, means to detachably connect the other end of said conduit to the forward end of the barrel portion and in communication with said passage, said handle portion being formed with a fluid supply passage communicating with said barrel passage, a check valve between said supply passage and said barrel passage allowing fluid to flow only from the supply passage to the barrel passage, a manually operated control valve in said handle passage, a source of fluid under pressure connected to said supply passage, a starter switch mounted on said handle portion, and a pair of flexible conductors connected to the terminals of said starter switch and adapted to be connected to the starter switch terminals of the starting solenoid of the internal combustion engine.

2. A compression tester for an internal combustion engine having a cylinder with a spark plug opening and having a starting solenoid, said tester comprising a main body having a barrel portion and a depending handle portion, said barrel portion being formed with a longitudinal passage extending from end to end thereof, the rear end of said passage being enlarged to define a fluid pressure chamber, a pressure gauge mounted on the rear end of said barrel portion in communication with said pressure chamber, a check valve in the forward end of said pressure chamber opening only to allow entry of fluid into the pressure chamber, a flexible conduit having a fitting on one end engageable in the spark plug opening, means to detachably connect the other end of said conduit to the forward end of the barrel portion in communication with said passage, a manually operated vent valve in the top wall of said pressure chamber, said handle portion being formed with a fluid supply passage communicating with said barrel passage a check valve between said supply passage and said barrel passage allowing fluid to flow only from the supply passage to the barrel passage, a manually operated control valve in said handle passage, a source of fluid under pressure connected to said supply passage, a starter switch mounted on said handle portion, and a pair of flexible conductors connected to the terminals of said starter switch and adapted to be connected to the starter switch terminals of the starting solenoid of the internal combustion engine.

3. A comparison tester for an internal combustion engine having a cylinder with a spark plug opening and having a starting solenoid, said tester comprising a main body having a barrel portion and a depending handle portion, said barrel portion being formed with a longitudinal passage extending from end to end thereof, the rear end of said passage being enlarged to define a fluid pressure chamber, a pressure gauge mounted on the rear end of said barrel portion in communication with said pressure chamber, a check valve in the forward end of said pressure chamber opening only to allow entry of fluid into the pressure chamber, a manually operated vent valve in the top wall of said pressure chamber, a flexible conduit having a fitting on one end engageable in the spark plug opening, means to detachably connect the other end of said conduit to the forward end of the barrel portion and in communication with said passage, said handle portion being formed with a fluid supply passage communicating with said barrel passage, a check valve between said supply passage and said barrel passage allowing fluid to flow only from the supply passage to the barrel passage, a manually operated control valve in said handle passage, said control valve being provided with a forwardly extending operating plunger having its forward end projecting forwardly from the handle portion, a source of fluid under pressure connected to said supply passage, a starter switch mounted on said handle portion below said operating plunger, and a pair of flexible conductors connected to the terminals of said starter switch and adapted to be connected to the starter switch terminals of the starting solenoid of the internal combustion engine.

4. A compression tester for an internal combustion engine having a cylinder with a spark plug opening and having a starting solenoid, said tester comprising a main body having a barrel portion and a depending handle portion, said barrel portion being formed with a longitudinal passage extending from end to end thereof, the rear end of said passage being enlarged to define a fluid pressure chamber, a pressure gauge mounted on the rear end of said barrel portion in communication with said pressure chamber, a check valve in the forward end of said pressure chamber opening only to allow entry of fluid into the pressure chamber, a manually operated vent valve in the top wall of said pressure chamber, a flexible conduit having a fitting on one end engageable in the spark plug opening, cooperating male and female snap coupling elements on the other end of said conduit and the forward end of said barrel member to detachably connect the conduit to the barrel member in communication with said passage, said handle portion being formed with a fluid supply passage communicating with said barrel passage, a check valve between said supply passage and said barrel passage allowing fluid to flow only from the supply passage to the barrel passage, a manually operated control valve in said handle passage, a source of fluid under pressure connected to said supply passage, a starter switch mounted on said handle portion, and a pair of flexible conductors connected to the terminals of said starter switch and adapted to be connected to the starter switch terminals of the starting solenoid of the internal combustion engine.

5. A compression tester for an internal combustion engine having a cylinder with a spark plug opening and having a starting solenoid, said tester comprising a main body having a barrel portion and a depending handle portion, said barrel portion being formed with a longitudinal passage extending from one end to the other thereof, the rear end of said passage being enlarged to define a fluid pressure chamber, a pressure gauge mounted on the rear end of said barrel portion in communication with said pressure chamber, a check valve in the forward end of said pressure chamber opening only to allow entry of fluid into the pressure chamber, a manually operated vent valve in the top wall of said pressure chamber, a flexible conduit having a fitting on one end engageable in the spark plug opening, cooperating male and female snap coupling elements on the other end of said conduit and the forward end of said barrel member to detachably connect the conduit to the barrel member in communication with said passage, said handle portion being formed with a fluid supply passage communicating with said barrel passage, a check valve between said supply passage and said barrel passage allowing fluid to flow only from the supply passage to the barrel passage, a manually operated control valve in said handle passage, said control valve being provided with a forwardly extending operating plunger having its forward end projecting forwardly from the handle portion, a source of fluid under pressure connected to said supply passage, a starter switch mounted on said handle portion below said operating plunger, and a pair of flexible conductors connected to the terminals of said starter switch and adapted to be connected to the starter switch terminals of the starting solenoid of the internal combustion engine.

References Cited by the Examiner
UNITED STATES PATENTS

| | | | |
|---|---|---|---|
| 1,403,685 | 1/1922 | Hammett | 73—47 |
| 2,352,350 | 6/1944 | Smith | 73—47 |
| 2,620,656 | 12/1952 | Peterson | 73—116 |
| 3,100,988 | 8/1963 | Mansfield | 73—116 |

RICHARD C. QUEISSER, *Primary Examiner.*

J. W. MYRACLE, *Assistant Examiner.*